(12) United States Patent
Harcar

(10) Patent No.: US 9,589,292 B1
(45) Date of Patent: Mar. 7, 2017

(54) ALTERNATIVE ITEM IDENTIFICATION SERVICE

(71) Applicant: Amazon Technologies, Inc., Reno, NV (US)

(72) Inventor: Christina Augusta Harcar, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 571 days.

(21) Appl. No.: 14/038,550

(22) Filed: Sep. 26, 2013

(51) Int. Cl.
*G06Q 30/06* (2012.01)
*G06Q 30/02* (2012.01)

(52) U.S. Cl.
CPC ..... *G06Q 30/0625* (2013.01); *G06Q 30/0217* (2013.01)

(58) Field of Classification Search
CPC ....................... G06Q 30/0629; G06Q 30/0207
USPC .................................. 705/14.1, 6.642, 14.19
See application file for complete search history.

(56) References Cited

U.S. PATENT DOCUMENTS

| | | | | |
|---|---|---|---|---|
| 2003/0033231 A1* | 2/2003 | Turner | ................... | G06Q 20/02 705/36 R |
| 2005/0004880 A1* | 1/2005 | Musgrove | .......... | G06Q 30/0253 705/400 |
| 2006/0173749 A1 | 8/2006 | Ward et al. | | |
| 2008/0091528 A1* | 4/2008 | Rampell | ............ | G06Q 30/0207 705/14.1 |
| 2013/0132854 A1* | 5/2013 | Raleigh | ................. | G06F 3/0482 715/738 |
| 2013/0232023 A2* | 9/2013 | Muse | ..................... | G06Q 30/08 705/26.3 |

OTHER PUBLICATIONS

BookInfoLine. Compare book prices from various book stores, by Eastwood Readers, last updated May 2, 2013, http://userscripts.org/scripts/show/65482 accessed on Sep. 2, 2013.
Book Burro—Remixing the bookstore for Greasemonkey, by Jesse Andrews, last updated Jul. 17, 2005, http://userscripts.org/scripts/show/1311 accessed on Sep. 2, 2013.

* cited by examiner

*Primary Examiner* — Hunter Wilder
(74) *Attorney, Agent, or Firm* — Knobbe, Martens, Olson & Bear, LLP

(57) ABSTRACT

Systems and methods can provide users with access to alternative content available from different providers without requiring the users to manually cross providers' platform boundaries. These systems and methods can enable a user browsing items in an electronic platform of a first provider to identify alternative versions of items available in another provider's platform that are free (or at reduced cost) or have other benefits in the other provider's electronic platform.

23 Claims, 7 Drawing Sheets

ALTERNATIVE ITEM IDENTIFICATION SERVICE

BACKGROUND

Many books are available today in electronic format. Such books are often referred to as e-books. Some specialized e-book readers are also available for reading e-books. These e-book readers typically include a processing unit, memory, and an electronic ink (or "e-ink") display, among other features. Devices other than specialized e-books may also be used for consuming e-book content, including laptops, desktops, cell phones (including smartphones), tablet computers, and the like.

Some providers of e-book readers make additional benefits or incentives available to those who purchase their e-book readers. These additional benefits or incentives can include free content or bonus content, among other benefits. For example, some providers of e-book readers also provide a lending service that enables owners of e-book readers to lend their books to each other free of charge and also to freely borrow books from a centralized repository of books. Some e-book reader providers also provide such benefits to users who subscribe to a subscription service. The subscription service may provide other benefits to users, including benefits that may be unrelated to e-books. For instance, some subscription services allow users to stream audio and/or video directly to a device such as a television or any other computer device. Some subscription services also provide free shipping on product purchases, among other benefits.

BRIEF DESCRIPTION OF THE DRAWINGS

Throughout the drawings, reference numbers are re-used to indicate correspondence between referenced elements. The drawings are provided to illustrate embodiments described herein and not to limit the scope thereof.

DETAILED DESCRIPTION

I. Introduction

Figure 1:
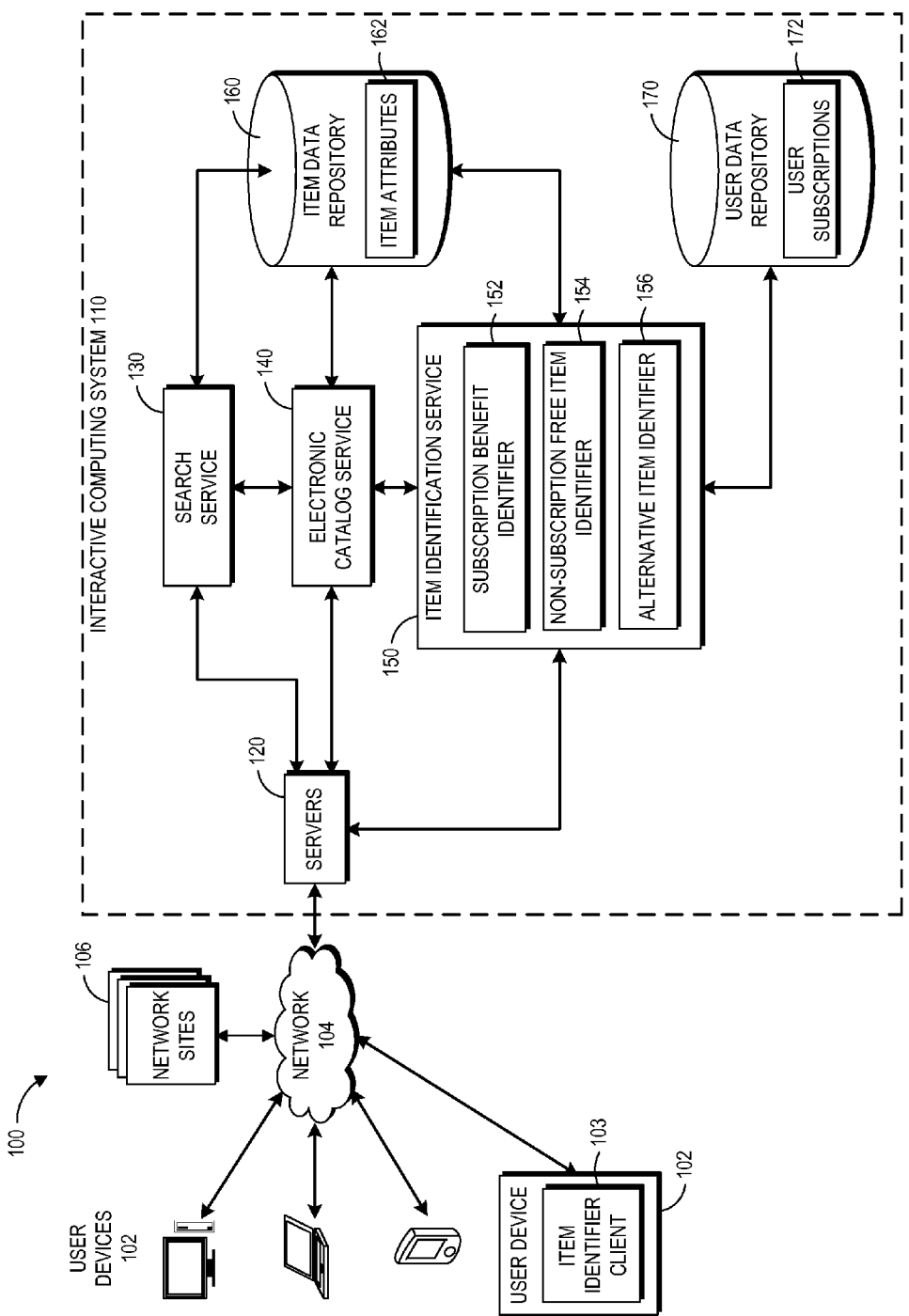
FIG. 1 depicts an embodiment of a computing environment that provides users with access to an interactive computing system capable of identifying an alternative version of an item of interest to a user, when the alternative version can be made available to the user for free or at a reduced cost.

Despite the benefits provided by subscription services described above, it can be difficult for users to discover the benefits of those services. For instance, if a user is using a computing device (other than an e-book reader that has the benefit of free lending of e-books), the user may not be able to use the computing device to identify whether a certain e-book can be freely lent from a lending service. If the user owns the e-book reader, the user may be frustrated that the user has to leave the computing device and instead use the e-book reader to learn this information. If the user does not own the e-book reader, the user may be less apt to purchase the e-book reader if the user is unable to ascertain what e-books are available from the lending service. More generally, there may be times when a user is accessing a hardware or software platform of a first provider and may be unable to discover, from within that platform, alternative versions of items available from a second provider.

Thus, if a user is browsing for items (e.g., products and/or services, whether digital or physical) in one provider's electronic platform or ecosystem, it can be beneficial to provide the user with some indication that that an alternative version of the item is available for free or at reduced cost in another provider's electronic platform or ecosystem. Accordingly, this disclosure describes embodiments of systems and methods that provide users with access to an alternative version of an item for free or at reduced cost without requiring the users to manually cross providers' platform boundaries. Thus, these systems and methods can enable a user who has found an item bearing a cost in a first platform to identify an alternative version for the item that is free, is at a reduced cost or has other benefits, in another platform. Those skilled in the art will appreciate that the alternative version available in the other platform, may be the same as, or a copy of the item available in the first platform, may differ from the item available in the first platform by format, edition, additional content, version number, etc., or may be a substitute for the item.

For purposes of illustration, the processes disclosed herein are described primarily in the context of an interactive computing system that presents users with items available for purchase or other acquisition from an electronic catalog or catalog system. The interactive computing system can be implemented as a network resource or application, which may be a website, a mobile application, a combination of the same, or the like. As will be apparent, the disclosed processes can also be used in other types of systems, and can be used to access information regarding digital items, such as but not limited to search results, news, real estate, social networking content, images, blogs, videos, music, movies, etc., as well as physical items.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system. Further, not necessarily all advantages described herein are shared by every embodiment of this disclosure.

II. Interactive Computing System Overview

Turning to FIG. 1, an example computing environment 100 is shown in which access to an interactive computing system 110 is provided to user devices 102 over a network 104. The interactive computing system 110 can represent a hardware and/or software platform or ecosystem for which users can search and browse an electronic catalog of items.

When users of the user devices 102 connect to the interactive computing system 110 over the network 104, the interactive computing system 110 can provide the users with direct access to information about free items, subscription items, or other alternative versions of items from directly within the platform of the interactive computing system 110. In addition, the interactive computing system 110 can provide the user devices 102 with access to the same information regarding free, subscription, and other alternative versions of items even when the user devices 102 are not directly connected to the interactive computing system 110 for the purposes of browsing or searching for items.

For instance, users of the user devices 102 may be connected to a network site 106 or other network resource provided by a different provider from a provider of the interactive computing system 110. While browsing the network site 106, the user may encounter a mention of an item in which the user is interested. An item identifier client 103 installed on the user device 102 can, in response to requests from the user (or automatically), access information about alternative versions of that item name from the interactive computing system 110.

By way of illustration, various example user devices 102 are shown including a desktop computer, laptop, and a mobile phone. In general, the user devices 102 can be any computing device such as a desktop; laptop; mobile phone (or smartphone); tablet; kiosk; gaming console or controller; television; wristwatch (including a smartwatch); electronic book reader; wireless device; set-top or other television box; media player; one or more processor devices; integrated circuit components for inclusion in computing devices, appliances, electronic devices for inclusion in vehicles or machinery; etc. The user devices 102 access the interactive computing system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the communication network 104 may be a publicly accessible network of linked networks, possibly operated by various distinct parties, such as the Internet. In some embodiments, the communication network 104 may be a private or semi-private network, such as a corporate or university intranet. The communication network 104 may include one or more wireless networks, such as a Global System for Mobile Communications (GSM) network, a Code Division Multiple Access (CDMA) network, a Long Term Evolution (LTE) network, or any other type of wireless network. The communication network 104 can use protocols and components for communicating via the Internet or any of the other aforementioned types of communication networks. Further, the interactive computing system 110 may be implemented in hardware and/or software and may, for instance, include one or more servers having physical computer hardware configured to implement computer executable instructions for performing various features that will be described herein. The one or more servers may be geographically disbursed or geographically co-located, for instance, in one or more data centers.

In the depicted embodiment, the interactive computing system 110 includes servers 120 which can communicate with the user devices 102 over the network 104 and which can provide access to various services of the interactive computing system 110. The services of the interactive computing system 110 include, in the depicted embodiment, a search service 130, an electronic catalog service 140, and an item identification service 150. These services 130, 140, 150 can be implemented in physical computer hardware on the servers 120 or in separate computing devices. Moreover, the processing of the various components or services of the interactive computing system 110 can be distributed across multiple machines, networks, or other computing resources. The various components or services of the interactive computing system 110 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the interactive computing system 110 can be stored in the memories of the servers 120 and/or on other types of non-transitory computer-readable storage media. While some examples of possible connections are shown, any subset of the components shown can communicate with any other subset of components in various implementations.

The search service 130 and the electronic catalog service 140 can provide users with access to an electronic catalog stored in an item data repository 160. The search engine 130 and/or electronic catalog service 140 can provide users with access to the items in the electronic catalog by way of a network site, which may be a network resource such as a website or a mobile application. For example, the electronic catalog service 140 can generate network pages that include detailed information about particular items (e.g., item detail pages).

The electronic catalog may include information about items that may be purchased, rented, or otherwise accessed by the users of the user devices 102. The information in the electronic catalog can be hierarchically organized according to categories, subcategories, and the like. As described above, the electronic catalog information contained in the item data repository 160 can include items other than products or services, such as blogs, periodicals, social networking profiles, or the like.

The item identification service 150 of the interactive computing system 110 can provide access to information about alternative versions of items to users of the user devices 102. The item identification service 150 can be accessed by the item identifier client 103 installed on the user devices 102 and is described in greater detail below.

As described above, the item identifier client 103 installed on the user devices 102 (one is shown for ease of illustration) can enable users to identify alternative versions of items available from the interactive computing system 110. The item identifier client 103 may be a browser, a plug-in to a browser, or some other type of add-on, extension, or script that is added on to a browser. Alternatively, the item identifier client 103 can be a mobile application or other application other than a browser.

In certain embodiments, the item identifier client 103 can work in at least one of two ways. In a first mode of operation, the item identifier client 103 can provide search functionality such as a search box or the like that enables a user to input search terms for an item to identify alternative versions of the item. Thus, for instance, the item identifier client 103 can provide a toolbar with a search box that is displayable in a browser window and that enables a user to type in the name of any item for which the user would like to find alternative version for free, at a reduce cost or with some other benefit. As an example, if a user is browsing a network-based encyclopedia such as Wikipedia.org, the user may notice the name of a book or other interesting item for which the user would like to identify an alternative version for free or at reduced cost. The user may type in the name of the book in the search box of the item identifier client 103. The item identifier client 103 may then query the item identification service 150 to determine whether an alternative version of that book is available. (See FIGS. 4 and 6, described in detail below.)

Similarly, a user using a mobile device such as a smartphone or tablet may load an application or a mobile application that includes the functionality of the item identifier client 103. This mobile application may include a search box or the like that enables the user to enter the name of an item for which the user would like to identify an alternative version. As an example, the user may be using an iPhone™ smartphone and may wish to determine whether a particular music title currently available in the Apple™ iTunes™ store for $0.99 has a free version available on a different platform (e.g., the interactive computing system 110). The user may access the item identifier client 103 by opening the item identifier client 103 application, type in the name of the item in a text box provided by the client 103, and obtain a result.

The examples provided herein of the item identifier client 103 including a search bar or a search box or the like are merely illustrative of a few ways to obtain information about alternative versions of items. Other examples of obtaining alternative information by the item identifier client 103 are described in greater detail below with respect to FIGS. 3 and 6.

With continued reference to FIG. 1, the item identification service 150 includes, in the depicted embodiment, a subscription benefit identifier 152, a non-subscription free item identifier 154 (or free item identifier 154), and an alternative item identifier 156. The subscription benefit identifier 152 can identify alternative versions of items that are free or at a reduced cost or have some other subscription benefit (such as free shipping) to subscribers of a subscription service. Data about user subscriptions, including free trial subscriptions, can be stored in a user data repository 170. One example of a subscription service is a subscription service that provides access to unlimited television and movie streaming to user devices 102. Users of the interactive computing system 110 who have signed up for such a subscription may have an attribute in their user profiles stored in the user data repository 170 that indicates that those users have a subscription. These attributes can also be stored in user subscription data 172, which may be a table or the like that stores information about user descriptions in a database.

If a user has a subscription to such a service, and the item identifier client 103 communicates with the subscription benefit identifier 152, the subscription benefit identifier 152 may identify the item for which the user has the subscription benefit and can provide this information to the item identifier client 103. In addition, the subscription benefit identifier 152 can provide subscription benefit information about items even for users who do not have a subscription. For instance, if a user of one of the user devices 102 is researching movies on a movie information network site, the user may identify a movie that the user wishes to watch and query the item identifier client 103 for information about that movie. Although the user in this particular example is not a subscriber of a video subscription service, the subscription benefit identifier 152 can determine whether the movie is associated with a subscription so that the user can choose to obtain a subscription to watch it. The subscription identifier 152 can do this by accessing the item data repository 162 and examining item attributes 162 of various items. For example, a movie in which the user is interested may have an attribute that indicates that it is free for streaming with the video subscription service. If the video is free for streaming with the service, then the subscription benefit identifier 152 can communicate this information to the item identifier client 103. The subscription benefit identifier 152 can also cause the subscription service (not shown) to directly provide access to the subscription benefit by streaming the movie to the user or providing a link or the like that enables the user to stream the movie.

The non-subscription free item identifier 154 can generally provide information about any item that has a free or reduced cost benefit other than through a subscription. For instance, some music compact disks (CDs) can be purchased with free digital rights to the MP3s or other electronic format of the music on the CDs. Thus, purchasers of such CDs may download the electronic format of the music even before the CD arrives in the mail after purchase. A user may wish to know whether a CD has this particular feature or whether a CD with this feature may be obtained. For instance, a user may be browsing the iTunes™ catalog available from Apple Inc. and may wish to know whether the interactive computing system 110, which may be provided by a different provider than Apple Inc., provides access to a CD plus the digital rights to the electronic version. Accordingly, the user may through the item identifier client 103 query the free item identifier 154 of the item identification service 150 to obtain this information. As another example, some e-book providers provide free or discount e-books to users who have purchased physical books from those providers. The free item identifier 154 can identify whether a user has purchased a physical book and recommend the corresponding e-book to the user. More generally, the free item identifier 154 (or alternative item identifier 156) can recommend other formats of the book (or similar works within a franchise), such as a corresponding e-book, audiobook, graphic novel, video game, or the like, whether for free or not. As yet another example, the free item identifier 154 can identify free trial subscriptions to magazines, newspapers, and other periodicals, blogs, audiobook subscription services, and the like. Moreover, the free item identifier 154 can also identify samples of books or other portions of items that can be recommended to users.

In addition, as shown, the item identification service 150 includes an alternative item identifier 156. The alternative item identifier 156 can identify alternative versions of items which may or may not be free but which may have additional or alternative features as compared with an item that the user is currently browsing. An example of such alternative versions of items includes music, videos, or other media content that do not have digital rights management (DRM) restrictions. Another example is a family friendly version of a video or music or other media item that may, for instance, include cleaner language or edited scenes or the like. Yet another example of an alternative version of an item includes bonus features on a DVD or a high definition optical disc (such as a Blu-Ray™ disc) and the like. Thus, a user of the user device 102 may query the item identifier client 103 to see if a particular item has an alternative version available through the interactive computing system 120. The alternative item identifier 156 can access the item data repository 160 to see if such attributes are available by identifying such attributes of the items from the item attribute data 162.

III. Example Alternative Version Identification Processes

Figure 2:
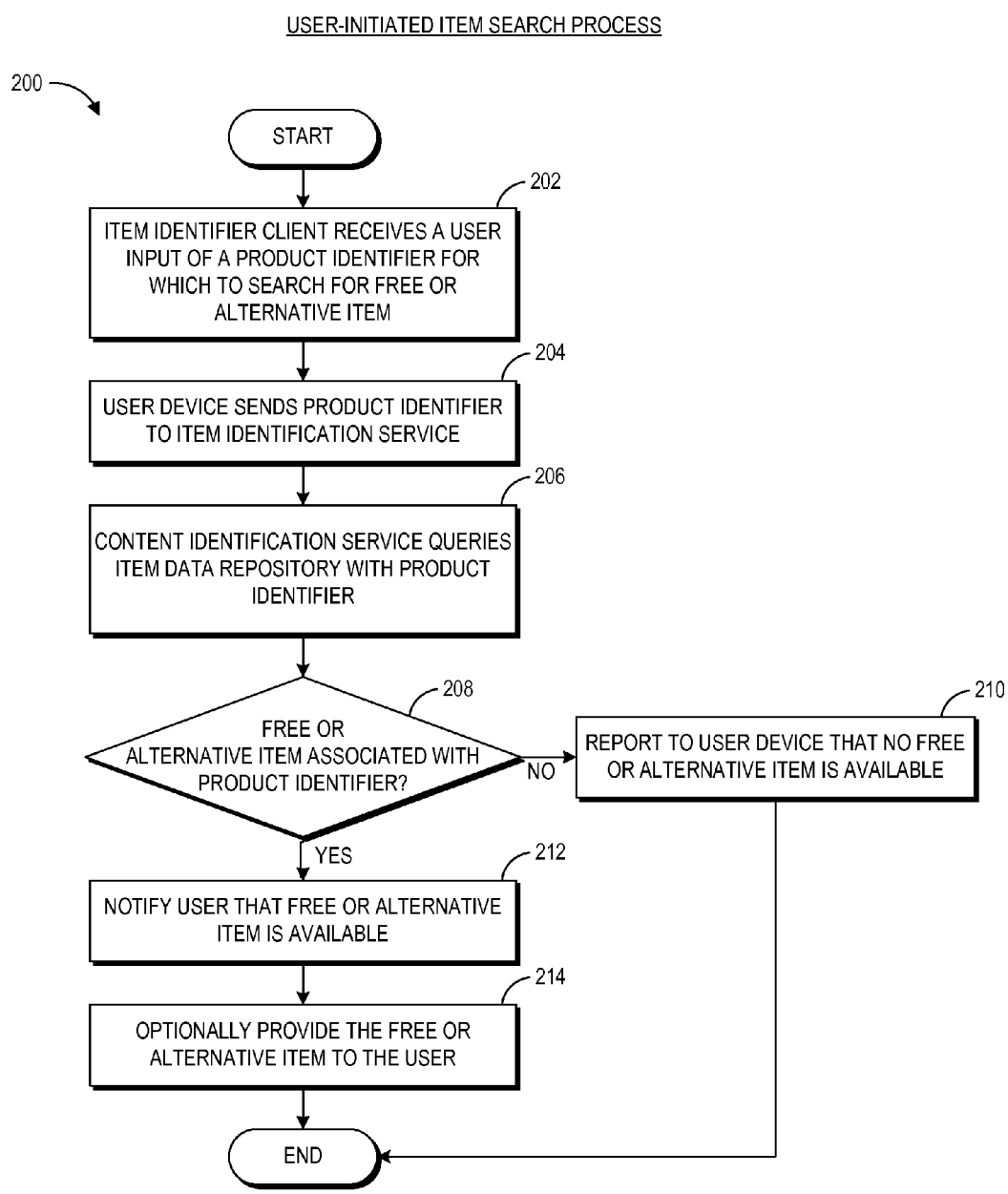
FIG. 2 depicts an embodiment of a user-initiated item search process.
Figure 3:
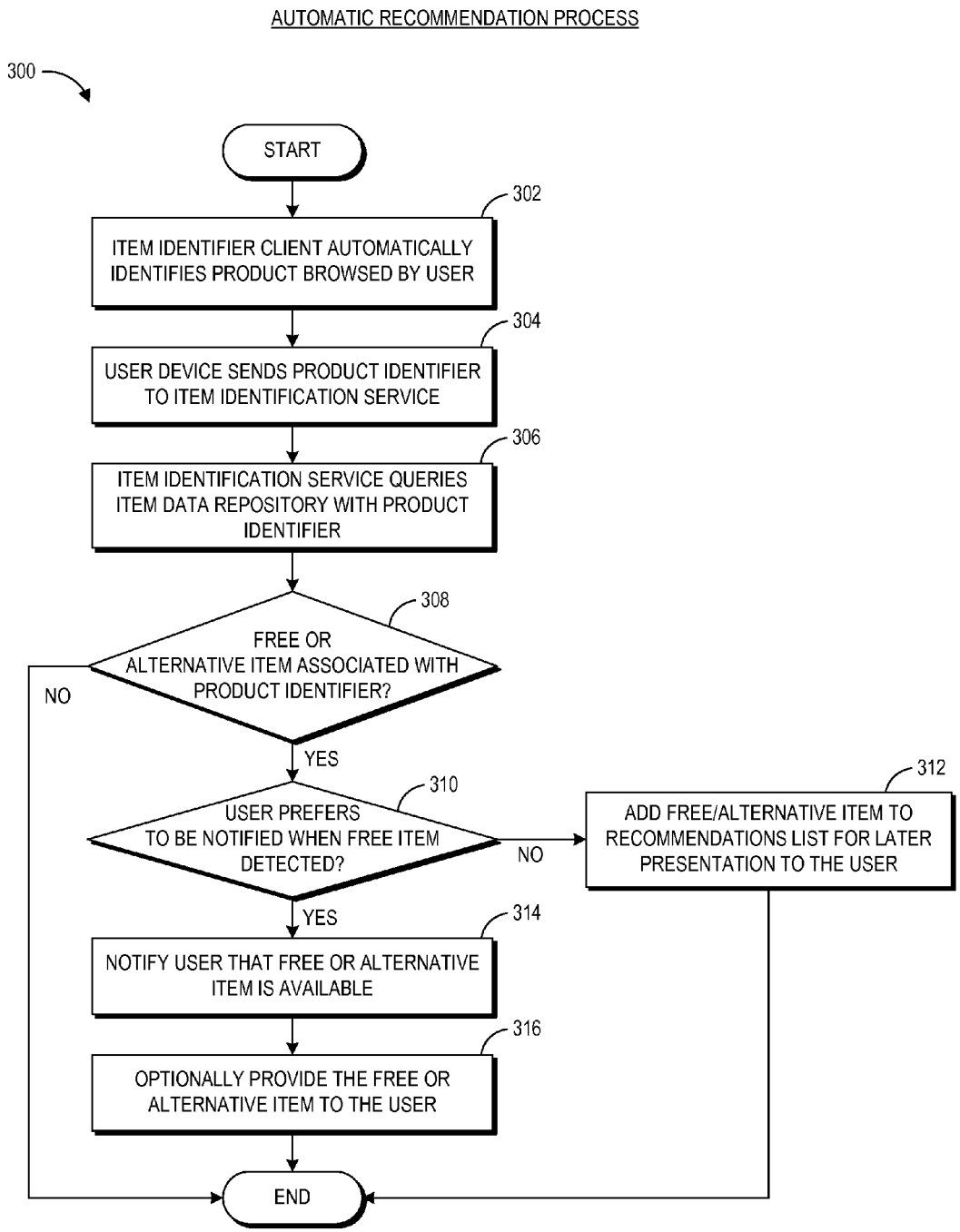
FIG. 3 depicts an embodiment of a benefit recommendation process.

Turning to FIGS. 2 and 3, example processes 200, 300 are shown that may be implemented by the item identifier client 103 and/or interactive computing system 110. In particular, FIG. 2 depicts a user-initiated item search process 200, and FIG. 3 depicts an automatic recommendation process 300. For convenience, the processes 200, 300 will be described in the context of the devices and systems shown in FIG. 1. However, it should be understood that the processes 200, 300 can be implemented by any computing device and not just the computing devices shown in FIG. 1.

With specific reference to FIG. 2, in the user initiated item search process 200, a user of one of the user devices 102 can obtain information about an alternative version of the item from the interactive computing system 110 through the item identifier client 103. At block 202 of the process 200, the item identifier client 103 receives a user input of an item identifier for which to search for an alternative version. As described above, the item identifier client 103 may be implemented with a search box or similar functionality that enables a user to enter a search term and receive a result that indicates whether an alternative version is available. Similarly, on touch screen devices a user may be able to long press, double tap or otherwise interact with an item name or identifier displayed on a network site to be able to obtain information about that item name as to whether there is an alternative version. Likewise, a user may be able to use voice recognition input on such a device to obtain information about an item name or identifier in which the user is interested. Other features for manual access of the item identifier client 103 are described below with respect to FIG. 6.

As described herein, an item identifier, in addition to having its ordinary meaning, can include not only an item name, but also an identifier other than names, such as an International Standard Book Numbers (ISBN), Universal Product Code (UPC), or Standard Identification Number (SIN). Thus, a user can enter an item name, ISBN, UPC, SIN, stock keeping unit (SKU) number, or other alphanumeric code that represents an item in the item identifier client 103.

At block 204, the item identifier client 103 sends the item identifier to the item identification service 150. At block 206, the item identification service 150 queries the item data repository 160 with an item identifier and determines at block 208 whether an alternative version is associated with the item identifier in the item data repository 160. If no alternative version is associated with the item identifier, the item identification service 150 can report to the user device that no alternative version is available at block 210. Thereafter, the process 200 may end. However, if there is an alternative version associated with the item identifier, then the item identification service 150 can notify the user that the alternative version is available at block 212. This notification may include, for example, sending an indication of the alternative version available to the item identifier client 103, which can then output a message for presentation to a user that the alternative version is available. Notification can also include adding the indication of the alternative version to a wish list, user queue, subscription queue, shopping cart, gift list (e.g., for another user), recommendations list (e.g., on a special recommendations page), combinations of the same, or the like.

At block 214, the alternative version is optionally provided to the user, for example, automatically. For instance, the item identification service 150 can automatically add a streaming movie to the user's watch list so that when the user accesses his or her television, or even at that moment, on the user's computing device, the user may be able to access that streaming media video. In another embodiment, the item identifier client 103 first outputs an indication to the user that the alternative version is available and then outputs a message that requests the user to access the alternative version from a wish list, queue, or the like.

Turning to FIG. 3, an automatic recommendation process 300 is shown. Like the process 200 shown in FIG. 2, the automatic recommendation process 300 can obtain information about alternative versions for users. However, in an embodiment, the automatic recommendation process 300 operates programmatically and automatically without input from a user to request an alternative version of the item. The automatic recommendation process 300 can automatically identify items browsed by a user, obtain information about those items, and notify the user accordingly about such items and their alternative versions that are available for free, at reduced cost or with some other benefit.

At block 302 of the process 300, the item identifier client 103 automatically identifies an item browsed by, accessed by, or otherwise associated with a user. The item identifier client 302 can track the user's browsing activity whether in a browser, a mobile application or the like, and can identify items accessed by the user. Such access can include the user selecting an item within an application store (or an item link in a retail network site). Further, such access can include the user merely accessing a network page on a network site that mentions an item.

More generally, the item identifier client 103 can identify keywords accessed by users in addition to, or instead of, item identifiers. The item identifier client 103 can, for instance, scrape or access info from any site visited by the user, including search engines (to obtain user queries and their results), user social media pages, retail sites visited by the user, sites most commonly visited by the user, sites where the user wants to have information about an alternative version related to any item on the site, or any other network page visited by the user or mobile application accessed by the user. The information scraped by the user can include item identifiers; keywords used by the user; keywords, topics, phrases, or likes from the user's social media networks; key phrases on a page accessed by the user; hyperlinks on the accessed page; most frequently used words or phrases on the accessed page; words, phrases or links highlighted by the user (e.g., with the mouse or other input method); words, phrases or links in banner ads; words or items identified in other targeted advertising associated with the page; adwords and paid-search keywords showing up in the user's browsing environment that may be searched for continuously or periodically; information about purchases or sales made by the user at other network retailers as an indicator of the user's interests, including user-supplied information about past purchases (which may be supplied, e.g., via a network page accessible from the item identification service 150); other data that becomes known through testing, surveys, trends, new metric technologies, or the like (such as book sample views by the user or item detail page views by the user); combinations of the same, and the like.

With continued reference to FIG. 3, at block 304, the user device can send the item identifier (or keywords) to the item identification service. At block 306, the item identification service 150 can query the item data repository 160 with the item identifier (or keywords). If at block 308, an alternative version of the item is associated with the item identifier (or keywords), the process 300 can proceed on to block 310; otherwise, the process 300 ends. At block 310, either the item identifier client 103 or the item identification service 150 can determine whether the user prefers to be notified when the alternative version is detected. For instance, the item identifier client 103 can include a settings user interface, or the like, that provides the user with the option to be notified when the alternative version is identified or to be notified later when the alternative version is identified.

If the user does not prefer to be notified when an alternative version is detected, then the alternative version can be added to a recommendations list for later presentation to the user at block 312. The item identification service 150 can refine this recommendations list to remove false positives based on, for example, past information about the user's preferences, or to encompass the user's changing interests. Over time, for instance, the item identification service 150 can down-weight items that have been on the recommendation list for a period of time so that older items appear lower in the list (or not at all) and newer items appear higher in the list. Block 312 can be implemented by either the item identifier client 103 or the item identification service 150. For instance, the item identification service 150 can add item names to a user's wish list, shopping cart, watch list, subscription queue, or the like to enable the user to access such items or the alternative versions of the items at a later time. Further, the alternative version may be added by the item identification service 150 to a recommendations list that is output on a specially reserved recommendation page for presentation to the user when the user visits a network site provided by the interactive computing system 110. In another embodiment, the alternative version is provided by the item identification service 150 or the item identifier client 103 to the user via email, text message, or any other messaging service or social networking service. If instead the user prefers to be notified if an alternative version is detected at block 310, then the item identifier client 103 can notify the user that the alternative version is available at block 314.

In one embodiment, this feature of notifying the user of the alternative version can act to save the user from spending resources when the user could have saved resources via the alternative version. For instance, if the user is viewing a web page, identifies a book that the user wishes to purchase and starts to initiate the purchase, the item identifier client 103 can notify the user that the user has a subscription and that, because of the subscription, the same book is available through a lending service for free or at a reduced cost. The item identifier client 103 can also notify the user that the item would be free or at a reduced cost if the user purchased a subscription or started a free trial of a subscription that includes access to the item. The item identifier client 103 can also notify the user of free samples of books or other items. The item identifier client 103 and/or item identification service 150 can therefore save the user from spending resources on the item when the user could have just as easily borrowed the item through a network-based lending service. Optionally the item identifier client 103 or item identification service 150 can provide the alternative version to the user at block 316 similar to block 214 described above.

In other embodiments, instead of or in addition to the item identifier client 103 identifying items and/or keywords browsed by the user, the item identification service 150 can automatically identify items or keywords browsed by, accessed by, or otherwise associated with a user based on internal metrics associated with the interactive computing system 110. For instance, the item identification service 150 can identify items purchased, viewed, searched, or otherwise selected by the user with respect to the search engine 130 and/or electronic catalog service 140. The item identifier client 103 can also identify lists of items of the electronic catalog accessed by users, including lists compiled by other users or recommendation lists targeted to the user; categories of the electronic catalog browsed by users; input on recommendations provided by users (such as input regarding whether a recommendation is a good recommendation or not); other internal information regarding interests of the user (such as an interest graph); and the like. Further, the item identification service 150 can identify users' interests from information about customer pools provided by affiliates, third parties, or other partners of the interactive computing system 110, e.g., from customer relationship management (CRM) data or other applications. In addition, the item identifier client 103 can run a continuous, automatic search against every hyperlink, keyword, or commonly recurring phrase on each page visited by users. Users of the interactive computing system 110 can filter the interests tracked by the item identification service 150 to obtain targeted alternative version results. For instance, filters may be seasonal or topic-based, and may be suggested by the interactive computing system 110, such as "Comic Con topics," "Holiday," "Gardening," "Game of Gilded Chairs," specific authors/genres, etc. Once the item identification service 150 has identified any of this information, the item identification service 150 can implement blocks 308 through 316 of the process 300, for example, by looking up keywords in block 308 to identify alternative versions.

Thus, the item identification service 150 can search for alternative versions to recommend to users based on user-supplied input (including search input and input regarding purchases made on sites other than a site provided by the interactive computing system 110), item identifiers or keywords scraped from user behavior on network pages, and/or information determined by internal metrics to the interactive computing system 110 (e.g., retailer internal metrics).

IV. Example Alternative Version Identification User Interfaces

FIGS. 4 through 7 depict various user interfaces for identifying an alternative version of an item for free or at reduced cost. Each of the user interfaces shown includes one or more user interface controls that can be selected by a user, for example, using a browser or other application software. The user interface controls shown are merely illustrative examples and can be varied in other embodiments. For instance, buttons, dropdown boxes, select boxes, text boxes, check boxes, slider controls, and other user interface controls shown, may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

Figure 4:
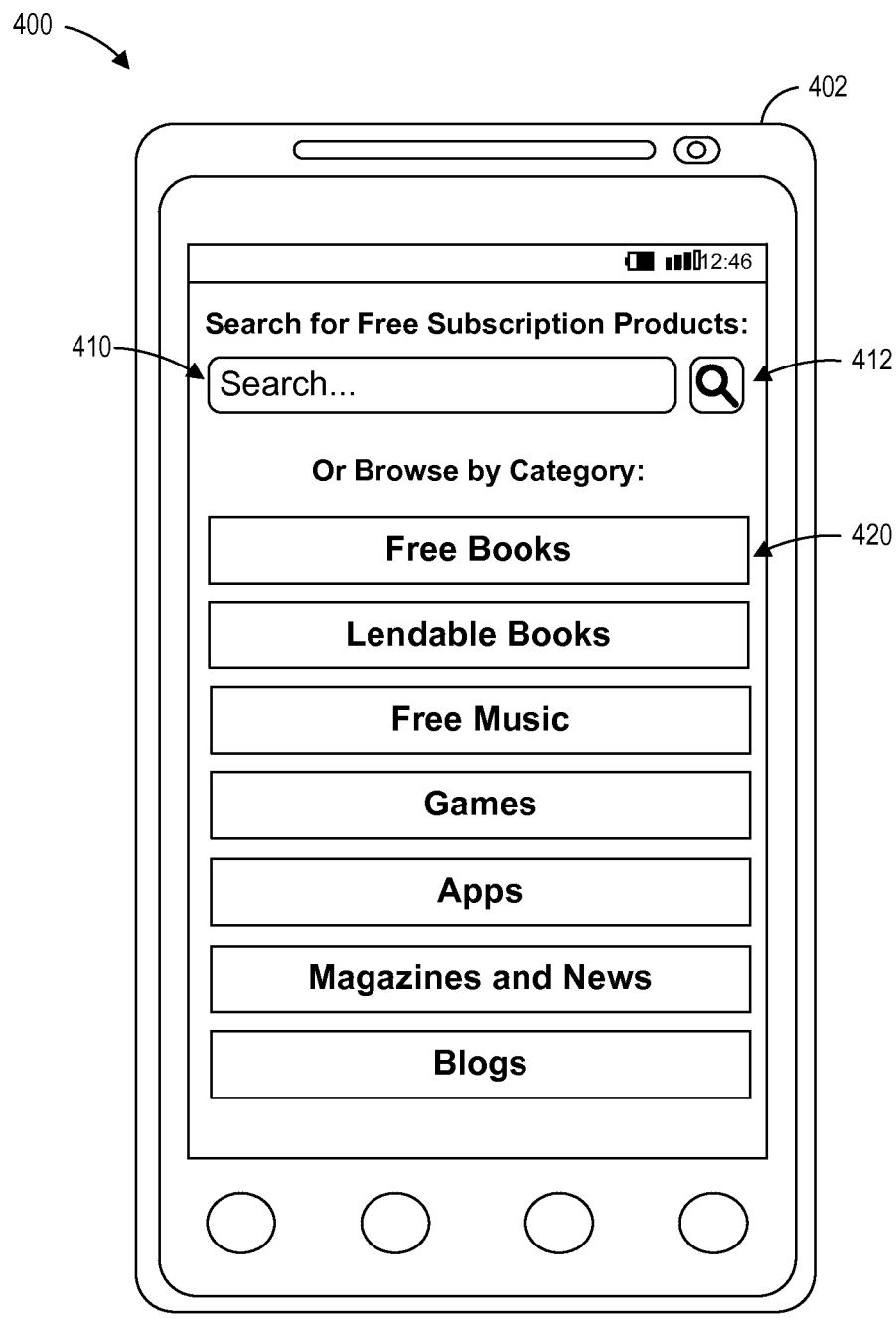
FIG. 4 depicts an example mobile device user interface that can provide access to an alternative version.

Turning to FIG. 4, an example user interface 400 is shown implemented in a mobile device 402, such as a smartphone or tablet. The example user interface 400 includes functionality to search for alternative items associated with a subscription, such as any of the subscriptions described above. In particular, the user interface 400 includes user interface controls 410 and 412 or searching for items. The user interface control 410 is an example search box into which a user can type text to search for an item name or an item identifier in order to determine whether an alternative version of the item is available for free, at reduced cost or is associated with some other benefit. A search button 412 can be selected by the user to initiate the search once the text is input into the text box 410.

In addition, the user may browse for free books, lendable books, free music or other items such as games, mobile applications, magazines, news, blogs, etc. by selecting any of the category buttons 420. Although not shown, the user interface 400 may, in other embodiments, also provide users with access to social media services, different media formats (e.g., audiobooks, audio, e-books, video games, graphic novels, etc.), media in different languages, and/or tabs for different user interests (such as knitting, electronics, etc.) and franchises (such as franchises based on a series of books, movies, etc.). Upon user selection of one of the category buttons 420, the user may select subcategories that are displayed and drill down through the subcategories to further subcategories to identify an alternative version.

One example use case for the user interface 400 is when a user is browsing for a digital item on a user device 102 that does not natively support an alternative version of the digital item for use with another type of device; or when a user is a member of a subscription service that may not be directly accessible on the user device 102. For example, the user interface 400 can enable a user to confirm whether an e-book is available from a lending service for free or at reduced cost without having to separately use the e-book reader that is typically required to access that lending service.

With continued reference to FIG. 4, the search box 410 can be included at the top of any application. For instance, the item identifier client 103 can be implemented as a wrapper application that is loaded by the operating system of a user device 102 in response to a request from the user or that is loaded automatically upon start-up. The search bar 410 can remain at the top of the user interface 400 of the user device 402 above any application that is loaded from within the item identification client 103. Thus, even if the user is browsing in an application from a different electronic platform than the interactive computing system 110, the user can enter an item name in the search bar 410 without having to leave that application. Instead of a wrapper application, the item identifier client 103 may operate in the background and scrape the screen of any application running in the foreground, apply optical character recognition (OCR) and parse text in the scraped screen, and/or identify item identifiers or keywords from the text. In another embodiment, the item identifier client 103 may detect user scrolling, mouse locations, or finger screen presses to infer which application a user is accessing or has most recently launched. The item identifier client 103 can also access operating system routines to determine which application the user has most recently launched. The item identifier client 103 can then access text typed by a user via operating system calls (such as hooking functions or the like) to identify item identifiers, keywords, or the like accessed by the user. Thus, the item identifier client 103 can obtain user search results within a mobile application such as iTunes™ or Google Play™, for example, by first inferring that a user launched such an application and then by inspecting text entered by the user in that application. In another embodiment, the item identifier client 103 can inspect packets sent to and from a mobile application to identify items or keywords accessed by the user via the application.

In other embodiments, the item identifier client 103 can be invoked from within any application by a user performing some type of long press or other shortcut gesture, such as a flick or shape drawn with the finger. Such a gesture can cause the item identification client 103 to be invoked by the operating system of the user device 402 in order to output a search box or the like. From this search box, the user can initiate a search for an alternative version.

In embodiments where the item identifier client 103 operates in the background, the item identifier client 103 can output notifications of alternative versions to a notification bar or home screen of the user device. The item identifier client 103 may also generate pop-up windows to make similar notifications in other embodiments.

Figure 5:
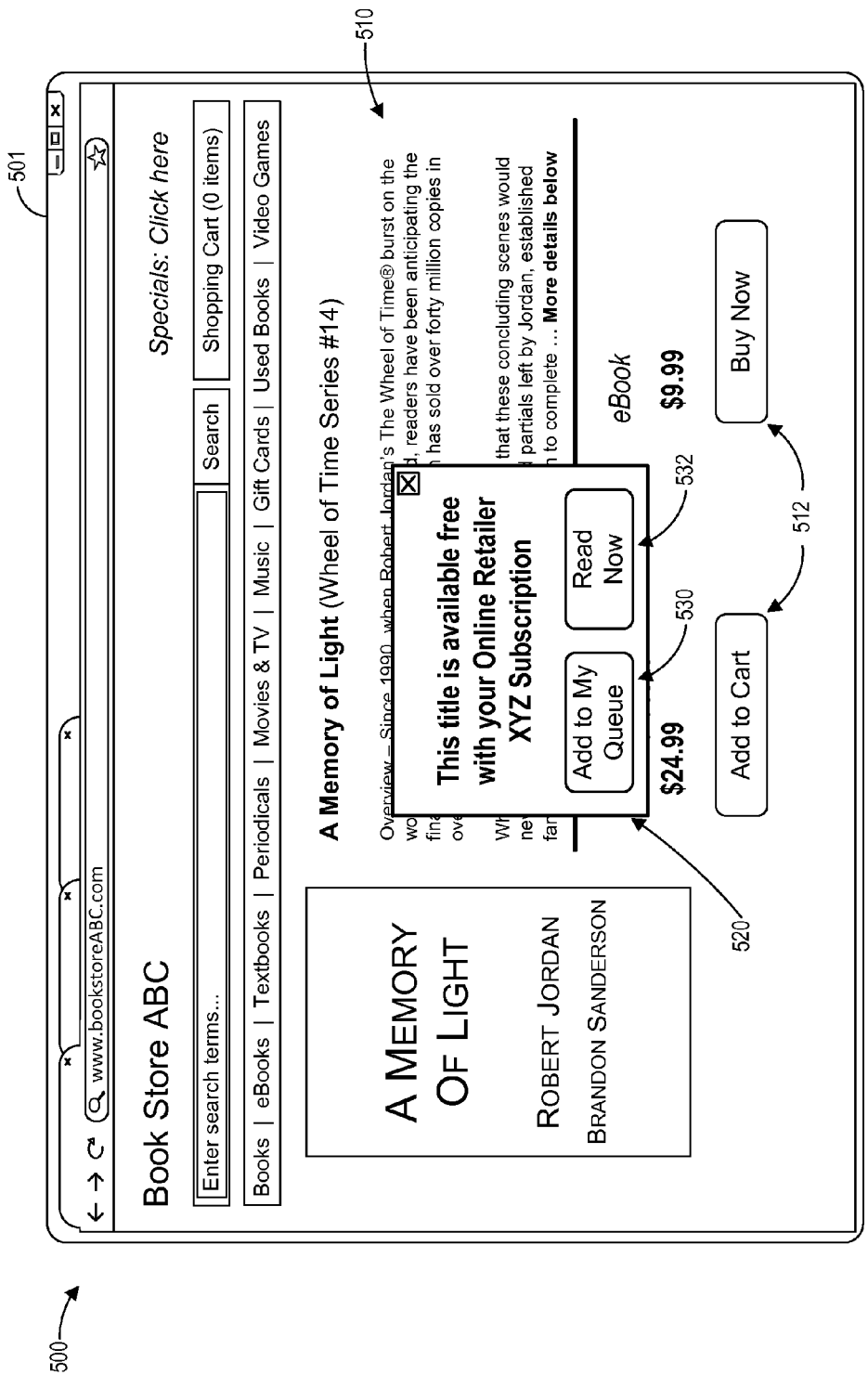
FIG. 5 depicts an example user interface that provides an indication of an available alternative version.

Turning to FIG. 5, an example user interface 500 is shown that may be implemented in a browser 501. The browser 501 may be installed on a user device such as one of the user devices 102. This particular user interface 500 depicts an electronic bookstore and includes text and images 510 associated with a book that a user is browsing. In the illustrated embodiment, buttons 512 allow the user to either add the book to a shopping cart or purchase an e-book version of the book. Options may also be provided in other embodiments for users to access a translation of the item description and/or book (or other item format).

In addition, a pop-up window 520 is displayed in the illustrated user interface 500. The pop-up window 520 informs the user that "This title is available free with your network retailer XYZ subscription." (If the user did not have a subscription, the pop-up window 520 might instead explain that the title would be free if the user were to purchase a subscription or start a trial subscription or purchase a computing device that comes with a subscription.) The pop-up window 520 also provides a button 530 for the user to add the book to the user's queue and a button 532 to read the book now. The pop-up window 520 is an example output of the item identifier client 103. The pop-up window 520 may be output automatically upon the item identifier client 103 detecting that an item being browsed by the user in the user interface 500 has an alternative version. Thus in this depicted example, the pop-up window 520 provided by the item identifier client 103 can help the user save resources by realizing that the user could access this title without having to buy it. Consequently, the item identifier client 103 can increase the user's appreciation for a subscription in which the user may have invested, which can in turn prompt or motivate the user to renew his or her subscription when the subscription expires.

Although the pop-up window 520 is shown as a pop-up window, this is not the only format of an output that the item identifier client 203 can produce. The item identifier client 103 can also output such information in a variety of other ways, including by directly modifying the web page being browsed to indicate the same type of message shown in the pop-up window 520; for example, using a scripting language such a JavaScript. Alternatively, the item identifier client 103 can output another type of message anywhere on the page including in the title bar, in a status bar, or in a separate window, among other options. Although the user interface 500 is shown as a browser, such functionality provided by the pop-up window 520 can be provided in mobile applications or applications other than a browser in some instances. Further, the user interface 500 can be implemented on any type of user device, including mobile devices.

Figure 6:
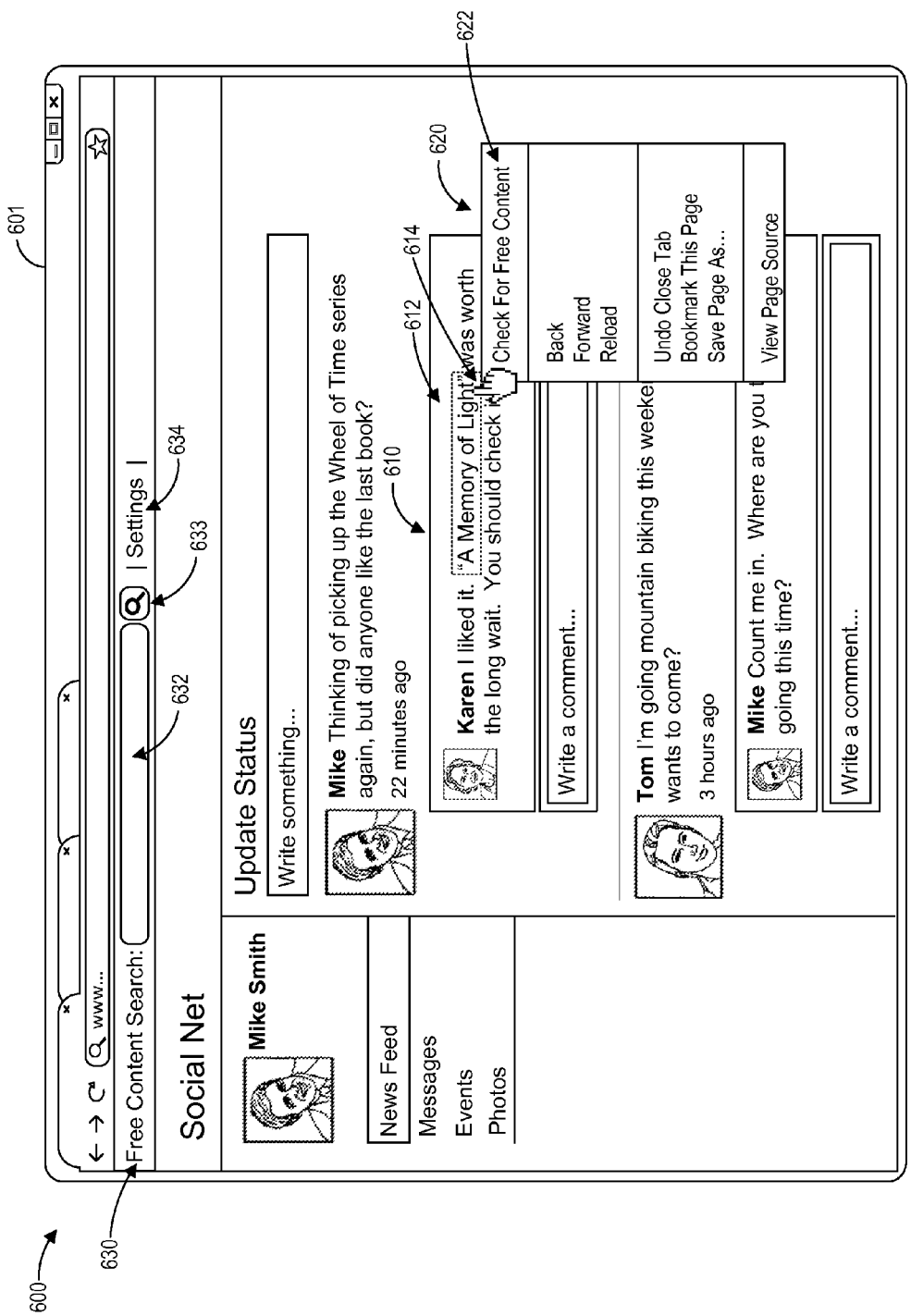
FIG. 6 depicts an example user interface that provides additional example tools for identifying an alternative version.

FIG. 6 shows another embodiment of user interface 600 that can be implemented in a browser 601. Like the user interface 500, the user interface 600 can also be implemented as an application or a mobile application other than a browser. The user interface 600 depicts text and images associated with a social network and can correspond to a network page output by a network site 106, such as a social networking website. The network site 106 can provide users with functionality to update their status, interact with other users, and the like.

Figure 7:
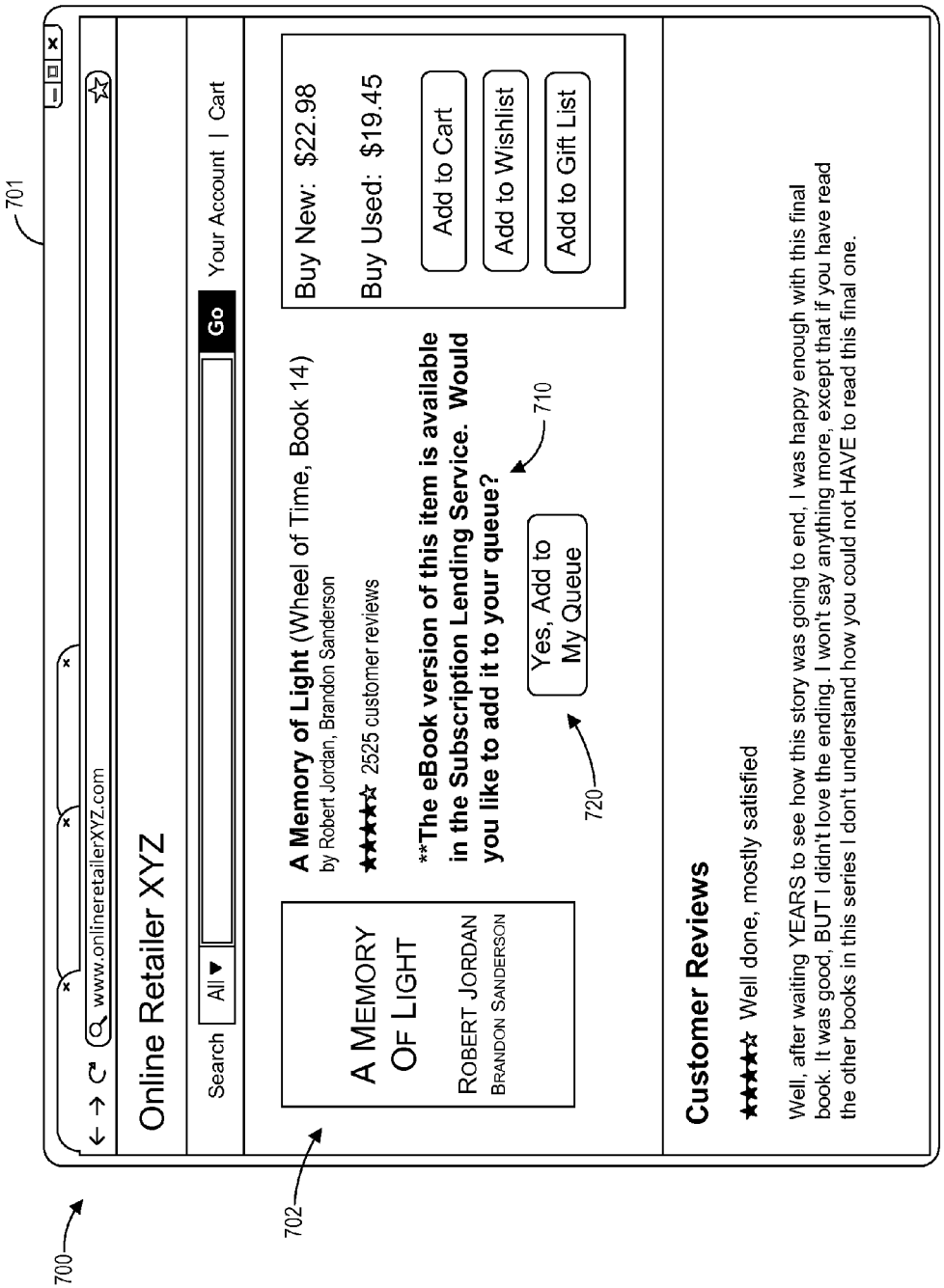
FIG. 7 depicts another example user interface that provides an indication of an available alternative version.

Different options are shown for enabling the user from within the user interface 600 to search for alternative versions of an item available for free, at reduced cost, or with some other benefit. For instance, a toolbar 630 is provided that includes a search box 632, a search button 633, and a settings button 634 that can be used by a user to identify an alternative version available for free. The toolbar 630 can be output by the item identifier client 103. A user can type an item name or other identifier in the search box 632 and select a search button 633 (or perform an equivalent keyboard shortcut) to initiate a search. The search may result in a user interface being presented to the user with information about the free alternative version. An example of such a user interface is shown in FIG. 7, described below.

In addition, the user can select the settings button 634 to adjust notification settings, among other settings associated with the user's use of the item identifier client 103. The settings 634 can enable a user to select whether to be notified as soon as the item identifier client 103 identifies an item that the user has browsed as being having an alternative version available. Alternatively, the settings 634 can allow the user to select not to be notified automatically or not to gather or check for alternative versions automatically, instead populating a list or queue with information about alternative versions. The settings can also allow users to save multiple searches, search criteria, or filters for different members of the user's family or household (such as criteria for children's content or different filters for family members).

Another way that the item identifier client 103 can enable users to check item names is also shown. In particular, a user has selected text 612 with a cursor 614. The text 612 that is selected is in a comment 610 made on the network page of the user interface 600 and references a book called *A Memory of Light*. Upon selection of this title, for example by dragging the mouse across the text 612 and right clicking with the mouse, a context menu 620 is displayed. The context menu 620 includes an option 622 for checking for free alternative versions. Upon user selection of this option 622, the item identifier client 103 can communicate with the item identification service 150 to see whether the title *A Memory of Light* is free or otherwise available with a subscription or other feature of the interactive computing system 110.

Although both the context menu 620 and the toolbar 630 are shown in the depicted embodiment, in other embodiments the item identification client 103 provides the context menu option 622 or the toolbar 630, but not both. Further, the user interface 600 may be adapted for an application other than a browser, such as a mobile application, by including a search bar such as a toolbar 630 at the top of an application. Similarly, a mobile application may provide a menu similar to the context menu 620 in response to a user's long press or double tap of an item name in a network page or selection of a settings button, or the like.

User selection of the "check for free version" option 622 or the search button 633 can result in a user interface such as the user interface 700 of FIG. 7. The user interface 700 may also implemented in a browser, but may likewise be adapted for display in a mobile application or other type of application. The illustrated user interface 700 includes text and images 702 associated with an item, which in this particular embodiment is a book entitled *A Memory of Light*. The user interface 700 may be accessed in response to the check for free version option 622 or search button 633 being selected. Upon selection of the option 622 or search button 633, the item identification service 150 can detect that a request for information about the item *A Memory of Light* has been received from the item identifier client 103. In the depicted embodiment, the item identification service 150 obtains an item detail page from the item data repository 160 and outputs this item detail page for presentation to the user.

In the user interface 700, the item detail page can include information about the item such as the title, a description, the cost, options for buying the item or adding the item to a wish list or gift list, customer reviews, recommendations for similar items, and/or the like. In addition, the item identification service 150 may modify a portion of the item detail page provided by the item data repository 160 to include message text 710 such as the message shown which says that "The e-book version of this item is available in the subscription lending service; would you like to add it to your queue?" Button 720 is provided by the item identification service 150 for adding the e-book to the user's queue for the subscription lending service.

Thus, this particular embodiment shows one manner in which the item identifier client 103 and item identification service 150 can output to a user that an item has an alternative version for free or reduced cost from the interactive computing system 110. Other alternatives are possible. For instance, instead of going to an item detail page such as shown in the user interface 700 from FIG. 6, the toolbar 630 could be updated to include an indication of whether the item searched for is has alternative versions available. A pop-up message may be displayed, or the right context menu 620 can be updated to reflect the fact that free alternative version is available. In addition, many other embodiments are possible.

V. Additional Embodiments

In addition to the embodiments described above, it should be noted that in certain embodiments, the interactive computing system 110 can provide an indication of a user's subscription benefit for presentation to the user. The interactive computing system 110 can track items the user has accessed through the subscription service and present an amount of savings (e.g., over buying such items elsewhere) to the user. This information can help users appreciate the value of their subscriptions and motivate users to renew their subscriptions. Such statistics could also be used to motivate other users to sign up for subscriptions. Similarly, the interactive computing system 110 can track savings that a user would have obtained had the user had a subscription with the interactive computing system 110. The interactive computing system 110 can track this information by monitoring which items the user purchased and the difference between the purchase price of those items and the price (which may be free) the user would have paid with a subscription. The interactive computing system 110 can present this indication of subscription savings for output to the user as a way to attract new subscribers. The interactive computing system 110 can present this output to a user after each purchase (e.g., in a toolbar, popup message, email, text, or the like) or as a running total of savings over a period of time (such as a day, week, month, year, etc.).

Further, if the item identification service 150 indicates that an alternative version of an item is not available, the item identification service 150 (or item identifier client 103) can output a user interface that enables a user to provide feedback. This feedback can include some indication of whether the user thinks the item should be free or available with another benefit. The provider of the interactive computing system 110 can use this feedback to determine what alternative versions to provide to users in the future.

Moreover, it should be noted that the item identification service 150 can identify alternative versions or items in a cross-platform fashion. If a user is using a smartphone and wishes to access a television show, the item identification service 150 can output an indication that the television show is free to watch on the user's television. Thus, despite the fact that the user is not using a television at the time, the item identification service 150 can still identify the alternative versions for the separate device (in this case, a television). In another embodiment, the item identification service 150 can make alternative versions available to any device of the user that can support that alternative version, automatically.

VI. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others.

What is claimed is:

1. A computer-implemented method comprising:
under control of a first computing device configured with specific computer-executable instructions,
presenting, on the first computing device, a user interface of at least one of a content page or application of a first provider, the user interface including information related to an item available from the first provider and of interest to a user of the first computing device;
obtaining, by an item identifier client, an item identifier corresponding to the item, wherein the item identifier client is installed on the first computing device and associated with a second provider different from the first provider;
electronically providing, to a second computing device, the item identifier, wherein receipt of the item identifier causes the second computing device to determine a free version of the item corresponding to the item identifier is electronically available from the second provider and to instruct the second provider to provide the first computing device with access to the free version of the item;
receiving, from the second computing device, an indication that the free version of the item is available from the second provider due to the first computing device being associated with a user profile having access to a subscription service associated with the second provider; and
in response to receiving the indication from the second computing device,
automatically generating, by the item identifier client, a notification indicating an availability of the free version of the item from the second provider,
presenting, by the item identifier client on the first computing device, the notification indicating the availability of the free version of the item from the second provider in the user interface by modifying at least one of the content page or the application, and
automatically retrieving the free version of the item.

2. The computer-implemented method of claim 1, wherein the free version of the item is available from the second provider due to the first computing device being associated with the user profile having access to the subscription service associated with the second provider and due to the free version being accessed with a computing device associated with the second provider.

3. The computer-implemented method of claim 1, wherein the free version of the item comprises an electronic book available from an electronic lending service.

4. The computer-implemented method of claim 1, wherein the item comprises digital content, and wherein the free version of the item is available from the second provider through a digital content streaming service.

5. The computer-implemented method of claim 1, wherein obtaining the item identifier comprises programmatically obtaining the item identifier from the information included in the user interface without requiring user input of the item identifier.

6. The computer-implemented method of claim 1, wherein obtaining the identifier of the item comprises receiving a user input of the item identifier.

7. The computer-implemented method of claim 1, wherein the generated notification comprises an indication of the availability of the free version of the item on a third computing device, and wherein the computer-implemented method further comprises, in response to receiving the indication from the second computing device that the free version of the item is available from the second provider, automatically causing the free version of the item to become available on the third computing device.

8. The computer-implemented method of claim 1, wherein the item comprises a movie, and wherein the computer-implemented method further comprises, in response to receiving the indication from the second computing device that the free version of the item is available from the second provider, automatically adding the video to a watch list accessible by a third computing device.

9. The computer-implemented method of claim 1, wherein obtaining an item identifier corresponding to the item further comprises:
accessing a first operating system routine of the first computing device;
determining that a first application is launched and running on the first computing device based on the accessed first operating system routine; and
accessing a first operating system call of the first computing device associated with the first application to obtain the item identifier.

10. The computer-implemented method of claim 1, further comprising:
detecting that the first computing device has started up; and
automatically loading a first application in response to detecting that the first computing device has started up, wherein the first application causes the first computing device to obtain the item identifier.

11. A system comprising:
a memory configured to store computer-executable instructions;
a processor device in communication with the memory; and
an item identifier client installed on the system, the processor device, when implementing the computer-executable instructions, configured to at least:
obtain, by the item identifier client, an item identifier of an item electronically accessed from a network resource associated with a first provider, wherein the item identifier client is associated with a second provider different than the first provider;
electronically provide, to an interactive computing system associated with the second provider, the item identifier, wherein receipt of the item identifier causes the interactive computing system to determine an alternative version of the item is available from the second provider and to instruct the second provider to provide the system with access to the alternative version of the item;
receive, from the interactive computing system, an indication that the alternative version of the item is available from the second provider; and
in response to receiving the indication from the second provider,
automatically generate, by the item identifier client, a notification indicating an availability of the alternative version of the item from the second provider,
present, by the item identifier client, the notification indicating the availability of the alternative version of the item from the second provider in a user interface of at least one of a content page or application of the first provider by modifying at least one of the content page or the application of the first provider, wherein the user interface includes information related to the item electronically accessed from the network resource associated with the first provider, and
automatically retrieve the alternative version of the item.

12. The system of claim 11, wherein the alternative version of the item is determined to be available due to the system being associated with a user profile having access to a subscription service associated with the second provider.

13. The system of claim 11, wherein the alternative version of the item is determined to be available due to the alternative version of the item being accessed with a user device associated with the second provider.

14. The system of claim 1, wherein the item is digital content, and wherein the alternative version of the item comprises a downloadable version of the digital content due to a computer-readable medium containing the digital content being purchased.

15. The system of claim 11, wherein the item is digital content, and
wherein the alternative version of the item comprises a version of the digital content without digital-rights management (DRM) restrictions.

16. The system of claim 11, wherein the item is digital content, and wherein the alternative version of the item includes at least one of bonus digital content or an edited version of the digital content.

17. The system of claim 11, wherein the item is a physical book, and wherein the alternative version of the item is an e-book version of the physical book.

18. The system of claim 11, wherein the item is digital content, and wherein the alternative version of the item is a version of the digital content accessible from a second application provided by the second provider.

19. The system of claim 11, wherein the alternative version of the item comprises at least one of a trial version of the item or a sample of the item.

20. The system of claim 11, wherein the alternative version of the item is available for free or at reduced cost.

21. The system of claim 11, wherein the notification comprises a message presented while the network resource is accessed.

22. The system of claim 21, wherein the processing device is further configured to at least present the message in response to detecting that the item is about to be purchased.

23. The system of claim 11, wherein the notification comprises a message regarding the availability of the alternative version of the item from the second provider stored for later access.

* * * * *